United States Patent
Mitcheson et al.

(10) Patent No.: US 10,170,940 B2
(45) Date of Patent: Jan. 1, 2019

(54) WIRELESS POWER TRANSFER SYSTEM

(71) Applicant: Imperial Innovations Limited, London (GB)

(72) Inventors: Paul Mitcheson, London (GB); David Yates, London (GB); Samer Aldhaher, London (GB)

(73) Assignee: Imperial Innovations Limited, London (GB)

( * ) Notice: Subject to any disclaimer, the term of this patent is extended or adjusted under 35 U.S.C. 154(b) by 152 days.

(21) Appl. No.: 15/146,851

(22) Filed: May 4, 2016

(65) Prior Publication Data
US 2017/0324277 A1    Nov. 9, 2017

(51) Int. Cl.
*H02J 50/12* (2016.01)
*H02J 7/02* (2016.01)
*H02M 7/537* (2006.01)

(52) U.S. Cl.
CPC .............. *H02J 50/12* (2016.02); *H02J 7/025* (2013.01); *H02M 7/537* (2013.01)

(58) Field of Classification Search
CPC ........... H02J 50/12; H02J 7/025; H02M 7/537
USPC .................................. 307/104, 9.1; 323/351
See application file for complete search history.

(56) References Cited

U.S. PATENT DOCUMENTS

| 2002/0060914 A1 | 5/2002 | Porter et al. |
| 2005/0162021 A1 | 7/2005 | Jenkins |
| 2010/0109443 A1* | 5/2010 | Cook ................... H01Q 1/2225 307/104 |
| 2014/0175868 A1* | 6/2014 | Sakakibara ........... H02M 7/537 307/9.1 |

FOREIGN PATENT DOCUMENTS

| WO | WO2009149464 | 12/2009 |
| WO | WO2013020138 | 2/2013 |
| WO | WO2015006673 | 1/2015 |

OTHER PUBLICATIONS

L. Roslaniec, A. S. Jurkov, A. A. Bastami and D. J. Perreault, "Design of Single-Switch Inverters for Variable Resistance/Load Modulation Operation," in IEEE Transactions on Power Electronics, vol. 30, No. 6, pp. 3200-3214, Jun. 2015, first published Jun. 2014, current version published Jan. 2015.*

Aldhaher, et al. "Class EF2 inverters for wireless power transfer applications" in IEEE Wireless Power Transfer Conference (WPTC), May 2015, pp. 1-4.

Aldhaher, et al. "Modelling and analysis of Class EF and Class EF Inverters With Series-Tuned Resonant Netwokrs" IEEE Trans. Power Electron., vol. 31, No. 5, pp. 3415-3430 May 2016.

(Continued)

*Primary Examiner* — Thomas Skibinski
(74) *Attorney, Agent, or Firm* — Lee & Hayes, P.C.

(57) ABSTRACT

A load-independent Class EF inverter may maintain ZVS operation, and produce a constant output current, rather than a constant output voltage, regardless of the load resistance. A constant output current allows the inverter to operate efficiently for a load range from zero resistance (short circuit) to a certain maximum load resistance, making the inverter more suitable as a coil driver for an IPT system. The resonant frequency of the resonant circuit may be tuned to a non-integer multiple of a switching frequency.

20 Claims, 5 Drawing Sheets

(56) References Cited

OTHER PUBLICATIONS

Aldhaher, et al. "Tuning Class E inverters applied in inductive links using saturable reactors," IEEE Trans. Power Electron., vol. 29, No. 6, pp. 2969-2978, Jun. 2014.
Choi, et al. "13.56 MHz 1.3 kW resonant converter with GaN FET for wireless power transfer" in IEEE Wireless Power Transfer Conf. (WPTC), May 2015, pp. 1-4.
Roslaniec, et al. "Design of single-switch inverters for variable resistance/load modulation operation" IEEE Trans. Power Electron., vol. 30, No. 6, pp. 3200-3214, Jun. 2015.
Zulinski, et al. "Load-independent Class E power inverters: Part I. Theoretical development" IEEE Trans. Circuits Syst. I, Reg. Papers, vol. 37, No. 8, pp. 1010-1018, Aug. 1990.

* cited by examiner

WIRELESS POWER TRANSFER SYSTEM

This disclosure relates to wireless power transfer. In particular, this disclosure relates to an inverter based on the class-E topology which is suitable for driving a transmitter coil in an inductive power transfer system.

BACKGROUND

Wireless power transfer has many industrial applications, and devices utilising wireless power transfer, such as wireless toothbrush chargers, wireless charging pads for mobile devices, and wirelessly charged medical devices implanted within the body, continue to grow in popularity.

Inductive power transfer (IPT) is an example of non-radiative wireless power transfer. In a typical inductive power transfer system, an alternating current passes through a transmitter coil. This causes the transmitter coil to produce a time-varying magnetic field. When a receiver coil is placed in the time-varying magnetic field, the magnetic field induces an alternating current in the receiver coil, which can then be used to drive a load. Thus, power is transmitted wirelessly from the transmitter coil to the receiver coil through the time-varying magnetic field.

When designing an inductive power transfer system, several factors need to be borne in mind, and several problems present themselves. In order to achieve efficient operation and maximum power throughput, it is generally required to operate the IPT system using a large magnetic field. However, design of the system can be restricted in this respect, for example by guidelines relating to exposure limits for electromagnetic fields set by the International Commission on Non-Ionising Radiation Protection (ICNIRP).

It is possible to use a power inverter to convert a DC signal to an AC signal in order to drive a transmitter coil in an IPT system. It is also possible to use a transistor as a switch within the inverter. When using a transistor switch however, two types of power loss can present themselves: conduction loss, and switching loss. The first is associated with the finite resistance of the transistor, whilst the second is associated with switching the transistor at non-zero voltage and non-zero current. This second type of power loss can be minimised using 'soft-switching' techniques, for example zero-voltage-switching (ZVS) techniques. ZVS involves switching the transistor on/off whilst zero voltage passes through the transistor.

With the above in mind, a problem with existing systems is that the magnetic field transmitted by a transmitter coil is dependent on the receiver load. For example, in a system with multiple devices each having a respective receiver load, the power available to any one device can be reduced if another receiver device moves closer to the transmitter coil. Also, introducing a new receiver device to the IPT system can reduce the power available to all the original receiver devices. The number, location and orientation of the receiver coils in the IPT system affects the effective resistive load of the transmitter coil, which brings about a change in the current passing through the transmitter coil. This in turn alters the magnetic field produced by the transmitter coil. This variation in magnetic field may cause the magnetic field to exceed ICNIRP limits and/or cause an unwanted reduction in maximum achievable range or power throughput. The change in current also causes increased power losses, and hence reduced efficiency of the IPT system, due to loss of ZVS operation.

It is desirable to provide an inverter for driving a transmitter coil which retains a high efficiency and which delivers a constant current to the transmitter coil, independent of the load. In providing such an inverter, it is also desirable to avoid or reduce the overhead of real-time circuit and system level control. It is also desirable to avoid switching losses which may occur whilst the transistor is being turned on and off.

SUMMARY

An invention is set out in the independent claims. Optional features are set out in the dependent claims.

According to a first aspect, there is provided a power inverter for driving a transmitter coil in an inductive power transfer system, wherein the inverter is suitable for class 'E' operation. The power inverter is arranged to drive a load resistance. The power inverter comprises a switching device arranged between a power source and ground and arranged to switch at a switching frequency, and a resonant network arranged in parallel with the switching device between the power source and ground. The resonant network has a resonant frequency which is a non-integer multiple of the switching frequency, such that, in operation, a substantially constant current passes through the load resistance.

It will be appreciated that the ground could alternatively be a reference node other than ground.

Optionally, in some embodiments, a first node of the switching device is coupled to ground, a second node of the switching device is coupled via a first inductor to a DC supply voltage, and a third node of the switching device is used to switch the switching device on and off.

Optionally, in some embodiments, a first capacitor is coupled in parallel with the switching device between the power source and ground.

Optionally, in some embodiments, the resonant network comprises a resonant circuit, the resonant circuit comprising a second inductor and a second capacitor.

Optionally, in some embodiments, the load comprises the resistance of a transmitter coil.

Optionally, in some embodiments, the load resistance comprises the resistance of at least one receiver coil.

Optionally, in some embodiments, the value of the load resistance can vary.

Optionally, in some embodiments, the non-integer multiple is preferably between 1 and 2, is more preferably between 1.5 and 1.65, and is even more preferably equal to 1.5 Optionally, in some embodiments, a third capacitor and a third inductor are coupled in series with the load resistance.

Optionally, in some embodiments, the inverter is arranged to maintain zero-voltage-switching operation.

According to another aspect, a method of fabricating a power inverter for driving a transmitter coil in an inductive power transfer system is provided. The inverter is suitable for class 'E' operation, is arranged to drive a load resistance, and the method comprises arranging a switching device between a power source and ground, and arranging the switching device to switch at a switching frequency. The method also comprises arranging a resonant network in parallel with the switching device between the power source and ground. The method also comprises arranging the resonant network to have a resonant frequency which is a non-integer multiple of the switching frequency, such that, in operation, a substantially constant current passes through the load resistance.

Optionally, in some embodiments, the inverter is as described above in relation to the first aspect.

According to an aspect, a rectifier for receiving an AC signal from a receiver coil in an inductive power transfer system is provided, wherein the rectifier is suitable for class 'E' operation and is arranged to drive a load resistance. The rectifier comprises a switching device arranged between a power source and the load resistance and arranged to switch at a switching frequency, and a resonant network having a resonant frequency which is a non-integer multiple of the switching frequency and arranged such that, in operation, a substantially constant current passes through the load resistance.

Optionally, in some embodiments the non-integer multiple is preferably between 1 and 2, is more preferably between 1.5 and 1.65, and is even more preferably equal to 1.5.

Optionally, in some embodiments the power source comprises a receiver coil.

According to another aspect, an inductive power transfer system comprising a transmitter circuit and a receiver circuit, the transmitter circuit comprising the inverter as described above and the receiver circuit comprising the rectifier as described above.

Optionally, in some embodiments the respective non-integer multiples of the switching frequencies of the inverter and rectifier are equal.

Optionally, in some embodiments the rectifier power source comprises a receiver coil, the inverter resistance load comprises a transmitter coil, wherein the transmitter coil is spaced from the receiver coil, and the receiver coil is arranged to receive power via inductive power transfer from the transmitter coil.

According to another aspect, a method of fabricating a rectifier for receiving an AC signal from a receiver coil in an inductive power transfer system is provided. The rectifier is suitable for class 'E' operation and is arranged to drive a load resistance. The method comprises arranging a switching device between a power source and the load resistance, arranging the switching device to switch at a switching frequency, and arranging a resonant network having a resonant frequency which is a non-integer multiple of the switching frequency, such that, in operation, a substantially constant current passes through the load resistance.

Optionally, in some embodiments, the inverter is as described above.

FIGURES

Specific embodiments are now described with reference to the drawings, in which.

OVERVIEW

Figure 1:
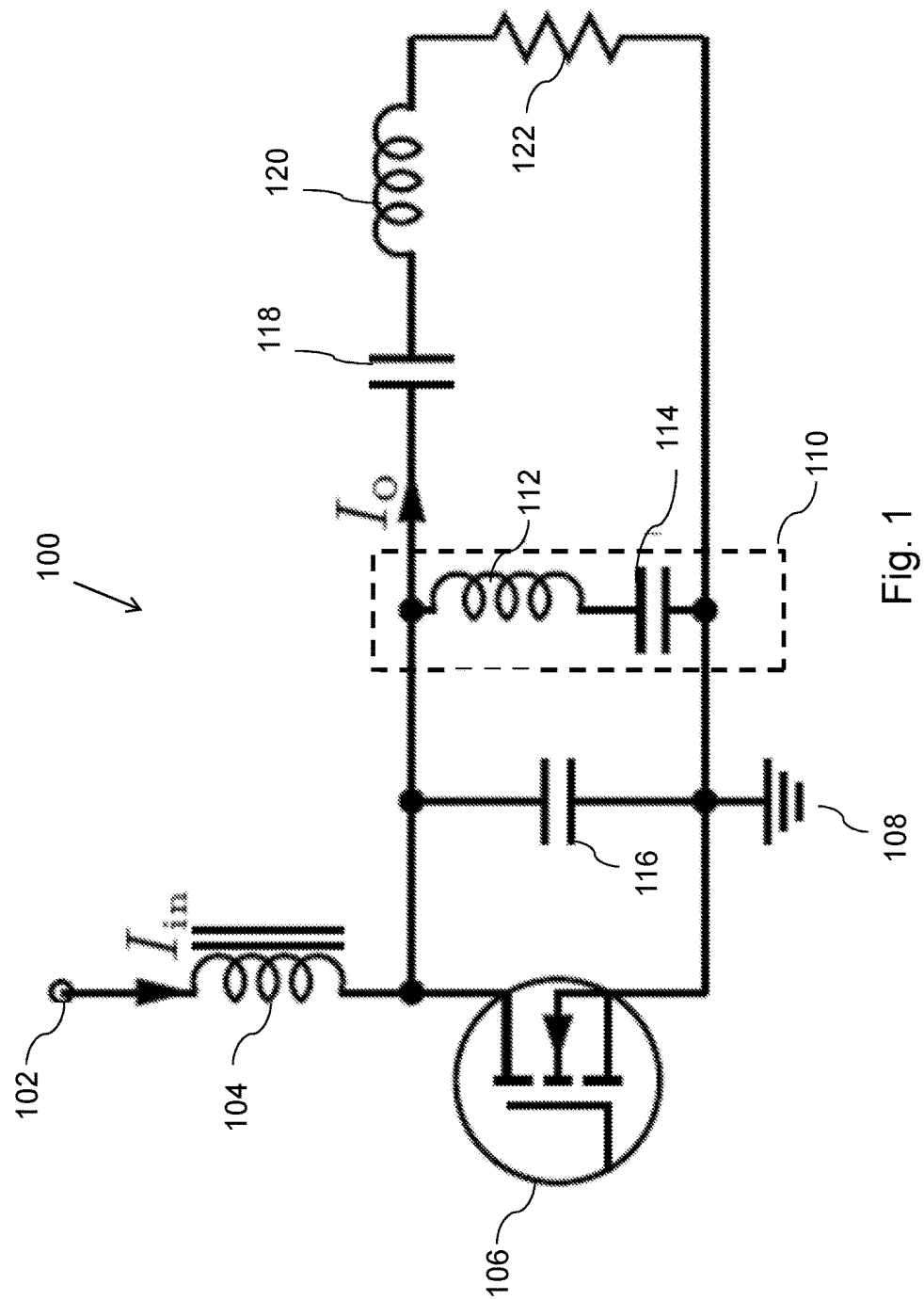
FIG. 1 is a schematic circuit diagram of a class EF inverter according to an embodiment of the present disclosure.

Resonant soft-switching converters, such as Class E and Class $EF_2$ inverters, can be used in high power wireless inductive power transfer (IPT) systems that operate at multi-megahertz frequencies due to their efficient operation and simple construction. However, resonant soft-switching converters are currently only optimised to operate at optimum switching conditions for a fixed load, and therefore are highly dependent on the load value. Current systems are therefore not tolerant to load variations, which causes them to become less efficient as the load deviates from its optimum value. Consequently, this limits an IPT system to function efficiently only at a fixed coil separation distance and for a narrow load range.

It is desirable for IPT systems to maintain high efficiency even with significant variation in receiver load and/or coupling factor between transmit and receive coils. Variations in coupling factor can be caused by relative motion between transmitter and receiver coils, and changes in receiver load can be caused by a change in power demand. In both cases, the resistive load which is reflected to the transmit coil from the receiver changes. This has two consequences. Firstly, efficiency of the transmit side class E (or related) inverter may be reduced due to loss of zero voltage switching (ZVS). Secondly, as the resistive load of the system changes, the transmit coil current can be changed, which in turn changes the magnetic field generated by the transmitter coil.

Disclosed herein is a load-independent Class EF inverter that maintains ZVS operation, and which produces a constant output current, rather than a constant output voltage, regardless of the load resistance. A constant output current allows the disclosed inverter to operate efficiently for a load range from zero resistance (short circuit) to a certain maximum load resistance, making the inverter more suitable as a coil driver for an IPT system.

As would be understood, the parasitics of the class-E circuit, for example the finite resistance of the transistor, give rise to second harmonic currents. To address this problem, class-EF circuits may incorporate a resonant circuit, sometimes called a tank circuit, which is always tuned to an integer multiple of the switching frequency in order to filter out the corresponding harmonic signal. The circuit designer can use resonant circuits to tune out harmonics, such as the second and/or third harmonic. For example, if the circuit designer desires to filter out the second harmonic current, the resonant circuit is designed to have a resonant frequency which is twice the switching frequency in order to maximise the impedance faced by the second harmonic current.

In inverters according to the present disclosure, the resonant frequency of the resonant circuit is instead tuned to a non-integer multiple of the switching frequency. This is completely counter to the teaching of the current state of the art in Class-E based inverters, and yet has the surprising effect that the current through the load is kept constant. Constant current operation means that the magnetic field is not subject to variations, and thus the magnetic field of the circuit can be kept in accordance with ICNIRP guidelines. Also, ZVS operation can be maintained, reducing switching losses in the inverter transistor.

DETAILED DESCRIPTION

The present invention will now be described more fully, and with reference to the accompanying drawings.

FIG. 1 is a schematic circuit diagram of an inverter 100 according to the present disclosure. The inverter 100 is based on a class E inverter, and more particularly is based on a class 'EF' inverter. In operation, the inverter 100 converts direct current (DC) from a power source 102 to alternating current (AC).

The inverter 100 incorporates a transistor 106. The transistor 106 may be a metal-oxide-semiconductor field-effect transistor 106 (MOSFET) as is known in the art. FIG. 1 shows an n-channel MOSFET. The transistor 106 is coupled to a first inductor 104 having a first inductance $L_1$. The first inductor 104 is coupled to the transistor 106 via a first transistor node, which, in the case that the transistor 106 is an N-channel MOSFET as in FIG. 1, will be the 'drive' node. The first inductor 104 is in turn coupled to a power source 102, which is arranged to provide a DC input signal to the inverter 100. The transistor 106 is also coupled to ground 108 via a second node which, in the case that the transistor 106 is an n-channel MOSFET, will be the 'source' node. Finally, the transistor 106 is switched on/off via a third transistor node which, in the case that the transistor 106 is an n-channel MOSFET, will be the 'gate' node. The transistor 106 can be switched on/off by applying an input from, for example, a signal generator (not shown). Typically, the signal generator produces a square wave input signal.

A first capacitor 116 having a first capacitance $C_1$ is connected in parallel with the transistor 106, between the first inductor 104 and ground 108. It will be appreciated that capacitor $C_1$ allows the inverter 106 to operate in a ZVS mode. The voltage on $C_1$ naturally falls to zero twice per cycle and these two events are the point where the transistor changes state. Thus, it is the function of the complete circuit (all the components operating together) that gives rise to these zero volt instances. The existence of the capacitor C1 means there is a finite rate of change of voltage across the transistor giving a finite time for it to change state.

A resonant circuit 110 is also connected in parallel between the first inductor 104 and ground 108. The resonant circuit 110 has a second inductor 112 having an inductance $L_2$, and a second capacitor 114 having a second capacitance $C_2$. The resonant circuit 110 has a resonant frequency $F_T$, which is dependent on the values of $C_2$ and $L_2$ as will be appreciated by those skilled in the art.

In embodiments of the present disclosure, the resonant circuit 110 is designed to have a resonant frequency $F_T$, which is a non-integer multiple of the transistor 106 switching frequency $F_{sw}$. Preferably, the non-integer multiple is between 1 and 2, is more preferably between 1.5 and 1.65, and is even more preferably equal to 1.5.

A third capacitor 118 having a third capacitance $C_3$, a third inductor 118 having a third inductance $L_3$, and a transmitter coil (not shown) are also connected in parallel with the transistor 106 and the first capacitor 116. The resistance of the transmitting coil forms part of the resistive load 122 of the inverter 100. In operation, the resistive load 122 of the inverter 100 is also increased in accordance with the respective resistive loads of any receiver coils within the IPT system. These respective receiver loads are 'reflected' to the transmitter coil when the IPT system is in operation, as will be understood by the skilled person. The value of the load may depend on the turns ratio and coupling factor, and can be considered to include the loss resistance of the receiver coil. It will thus be understood that the resistive load 122 experienced by the inverter 100 can vary as the receiver coils change in number, orientation, size or distance from the transmitter coil.

In the circuit of FIG. 1, $I_{in}$ is the steady input current. A significant DC component with little current ripple is expected. $I_o$ is the sinusoidal output current that flows in the transmit coil.

In operation, the power source 102 supplies a DC input signal to the inverter. The transistor 106 is switched on and off at a switching frequency $F_{sw}$. This has the effect of producing an AC output signal, which passes through the load. As the AC current passes through the transmitter coil, a time-varying magnetic field is produced.

As will be appreciated by those skilled in the art, switching the transistor 106 on or off whilst a non-zero current or voltage is passing through the transistor 106 gives rise to switching losses through the transistor 106, in accordance with the well-known equation P=IV; where P is the loss of energy in the transistor 106 per second, I is the current passing through the transistor 106 and V is the voltage across the transistor 106.

The resonant circuit 110, which has a resonant frequency which is a non-integer multiple of the switching frequency, acts to keep the current flowing through the transmitter coil constant, as will be described in more detail below.

Let the ratio of the resonant frequency $F_t$ of the tuning circuit to the switching frequency $F_{sw}$ be represented by parameter $q_1$.

The current $I_y$ is sinusoidal and is given by equation (1):

$$i_o(\omega t) = I_m \sin(\omega t + \phi) \quad (1)$$

where $I_m$ is the output current's magnitude and $\phi$ is its phase. It is assumed that switch is on for the period $0 < \omega t < 2\pi D$ and off for the period $2\pi D < \omega t < 2\pi$. Beginning with the series tuning circuit network, its current is given by equation (2):

$$\frac{i_{L_2}}{I_{IN}}(\omega t) = A_2 \cos(q_2 \omega t) + B_2 \sin(q_2 \omega t) - \frac{q_2^2 p}{q_2^2 - 1} \sin(\omega t + \phi) + \frac{1}{k+1} \quad (2)$$

where (3), (4), (5):

$$k = \frac{C_1}{C_2} \quad (3)$$

$$q_2 = \frac{1}{\omega}\sqrt{\frac{C_1 + C_2}{L_2 C_1 C_2}} = q_1 \sqrt{\frac{k+1}{k}} \quad (4)$$

$$p = \frac{C_2}{C_1 + C_2} \frac{I_m}{I_{IN}} = \frac{1}{k+1} \frac{I_m}{I_{IN}} \quad (5)$$

and the coefficients $A_2$ and $B_2$ are to be determined based on the equation's boundary conditions. The boundary conditions are determined from the current and voltage continuity conditions when the switch turns on and off. Parameter p is referred to as the loading parameter. The current in capacitor $C_1$ is given by equation (6):

$$\frac{I_{C_1}}{I_{IN}}(\omega t) = 1 - p(k+1)\sin(\omega t + \phi) - \frac{I_{L_2}}{I_{IN}}(\omega t). \quad (6)$$

The drain for the period $2\pi D < \omega t < 2\pi$ is given by equation (7):

$$\frac{v_{DS}(\omega t)}{V_{IN}} = 2\pi \frac{\beta(\omega t)}{\alpha} \quad (7)$$

where (8):

$$\beta(\omega t) = \int_{2\pi D}^{\omega t} \frac{I_{C_1}}{I_{IN}}(\tau)d\tau. \tag{8}$$

and (9):

$$\alpha = \int_{2\pi D}^{2\pi} \beta(\omega t)d\omega t. \tag{9}$$

The voltage across the load resistor and the residual impedance in the output load network is given by equations (10), (11):

$$\frac{v_{R_L}}{V_{IN}} = \frac{2}{\alpha}\int_{2\pi D}^{2\pi} \beta(\omega t)\sin(\omega t + \phi)d\omega t = \frac{2}{\alpha}\psi_1 \tag{10}$$

$$\frac{V_{jX}}{V_{IN}} = \frac{2}{\alpha}\int_{2\pi D}^{2\pi} \beta(\omega t)\cos(\omega t + \phi)d\omega t = \frac{2}{\alpha}\psi_2. \tag{11}$$

In the graph of FIG. 2(a), the y axis shows $V_{DS}/V_{in}$. The y axis is measured in increments of 1 from −1 to 3. The x axis shows ωt, measured between 0 and 2π.

In the graph of FIG. 2(b), the y axis shows $I_o/I_{in}$. The y axis is measured in increments of 1 from 0 to 4. The x axis shows ωt, measured between 0 and 2π.

In the graph of FIG. 2(c), the y axis shows $I_{DS}/I_{in}$. The y axis is measured in increments of 2 from −4 to 4. The x axis shows ωt, measured between 0 and 2π.

Figure 2:
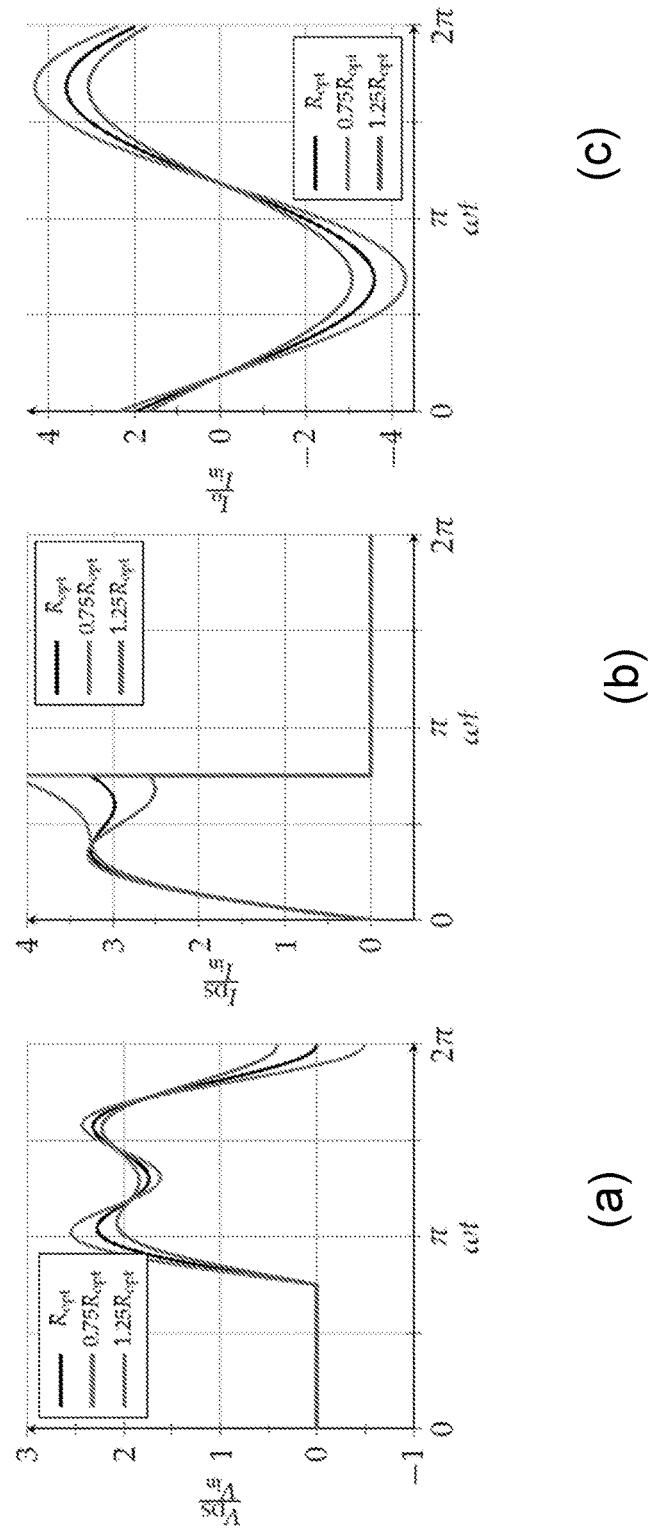
FIG. 2 shows voltage and current waveforms for an inverter in accordance with an embodiment of the present disclosure.

In each of FIGS. 2 (a), (b), and (c), a black line represents the optimum resistance $R_{opt}$, a grey line represents 0.75 $R_{opt}$, and a blue/teal line shows 1.25 $R_{opt}$.

FIG. 2 shows the effect of the load resistance varying by 25% above and below the optimum load for a Class $EF_2$ inverter. The graphs show the effect on the switch voltage and current and the output voltage for a Class $EF_2$ inverter at a fixed duty cycle of 37:5%, q1=2 & k=0:867

It can be noticed that ZVS is lost once the load varies above or below its optimum value. For higher load resistances the switch turns at a positive voltage which discharges the charge in capacitor C1 which results in a large current spike to flow through the switch. In practice, the current spike results in energy being lost in the switch's on resistance which then degrades the overall efficiency. It can also cause damage to the switch if its value exceeds the switch's current rating. The same occurs when the load resistance is below its optimum value. However, since a MOSFET with body diode may be used in the circuit, the body diode begins to conduct once the MOSFETs drain to source voltage crosses zero volts and exceeds the diode's forward. The current spike has a much lower magnitude here since the diode's forward voltage is low. Nevertheless, the overall efficiency will still degrade. Furthermore, the output current and voltage across the load resistance $R_L$ will change as the value of the load resistance changes.

To achieve load-independent operation, the following criteria are to be met regardless of the load value:

1. Constant output AC current

Equation 10 can be written in the form of equation (12), below:

$$\frac{2}{\alpha(p)}\psi_1(p) = \frac{I_m R_L}{V_{IN}} = \frac{I_m}{I_{IN}}\frac{R_L}{R_{IN}}. \tag{12}$$

Since it has been assumed that there are no losses in the circuit, all the power supplied by the input voltage is consumed in the load. The following equation (13), can be obtained $$\frac{R_L}{R_{IN}} = \frac{2}{\left(\frac{I_m}{I_{IN}}\right)^2}. \tag{13}$$

Substituting the above equation, (13), in equation (12), gives equation (14):

$$\frac{\psi_1(p)}{\alpha(p)} = \frac{I_{IN}}{I_m}. \tag{14}$$

The loading parameter p would increase as the load resistance decreases and vice versa Thus p can always be a positive real number, hence p∈ℝ$^+$. Referring to equation 14, achieving a constant output current against any load variations means the parameters of the circuit, mainly the phase will be constant for any value of p (i.e. independent of p). This criteria means that the rate of change of equation 14 with respect to p will be zero, this can be represented by equation (15):

$$\frac{\partial}{\partial p}\left(\frac{\psi_1(p)}{\alpha(p)}\right) = 0 \text{ over } \mathbb{D}_p. \tag{15}$$

2. Constant switching at zero-voltage

Zero-voltage switching or 'high efficiency' operation can be achieved by setting the switch voltage in equation 7 to zero, which produces the following, equation (16):

$$\beta(2\pi)=0 \text{ over } \mathbb{D}_p. \tag{16}$$

In the graph of FIG. 3(a), the y axis shows $V_{DS}/V_{in}$. The y axis is measured in increments of 1 from 0 to 3. The x axis shows ωt, measured between 0 and 2π.

In the graph of FIG. 3(b), the y axis shows $X_c$ ($I_{OS}/V_{in}$). The y axis is measured in increments of 2 from −4 to 4. The x axis shows ωt, measured between 0 and 2π.

In the graph of FIG. 3(c), the y axis shows $X_c$ ($I_o/V_{in}$). The y axis is measured in increments of 1 from 0 to 4. The x axis shows ωt, measured between 0 and 2π.

Figure 3:
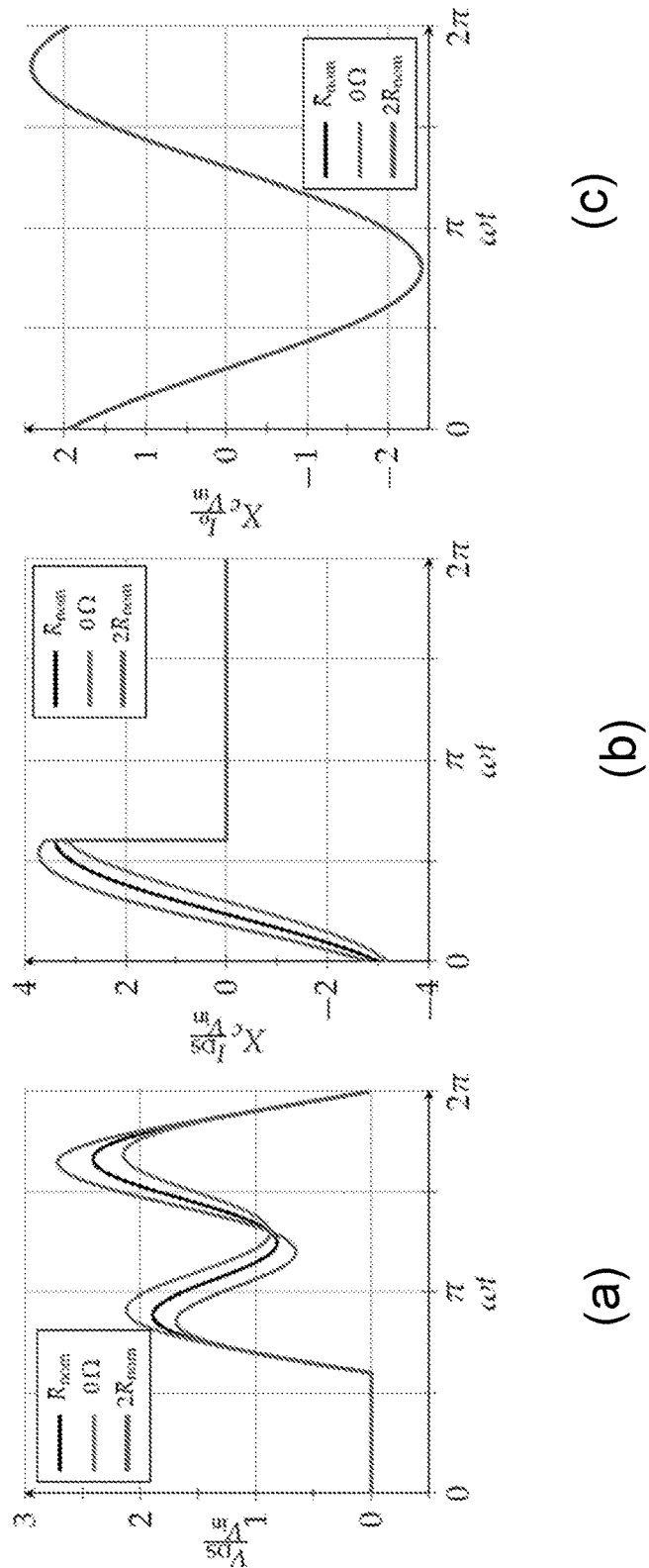
FIG. 3 shows voltage and current waveforms for an inverter in accordance with an embodiment of the present disclosure.

In each of FIGS. 3 (a), (b), and (c), a black line represents the nominal load value $R_{nom}$, a grey line represents 0Ω, and a blue/teal line shows 2 $R_{nom}$.

FIG. 3 shows the voltage and current waveforms of the Class EF inverter at different load resistance values. In the graph of FIG. 3, voltage and current waveforms are shown for a load independent Class EF inverter under various loads at fixed duty cycle of 30:0%, q1=1:67 & k=1:33. It can be seen that constant output current and ZVS are maintained as the load varies from its nominal value ($R_{nom}$).

The output current for a desired p and load resistance is given by equation (17):

$$I_m = 2\frac{\psi_1(p)}{\alpha(p)}\frac{V_{IN}}{R_L}. \qquad (17)$$

The value of capacitor C1 is given by equation (18):

$$\frac{1}{\omega R_L C_1} = \frac{\pi p^2 (k+1)^2}{\alpha(p)}. \qquad (18)$$

For a given design the value of reactance X will also be fixed and independent of the load. Therefore function $\psi_2$ can only be dependent on q, k, φ and D. As a result, the reactance X normalised to $\omega C_1$ for given solution set of q, k, φ and D is given by equation (19):

$$\frac{X(q, k, \phi, D)}{\omega C_1} = \frac{1}{\pi p(k+1)}\psi_2(q, k, \phi, D). \qquad (19)$$

Further to the above, as an example, a load-independent Class EF inverter may be designed to generate a constant output current with an amplitude of 5 A at 6.78 MHz for a inductive wireless power transfer system. The load resistance varies from a maximum 2Ω to a minimum 0Ω and the coil inductance is 1:5 μH.

In designing a suitable system, a circuit designer may begin by choosing values for $q_1$ and the duty cycle. The following values and calculations serve as an example embodiment of the present disclosure.

As an example, it has been found that a $q_1$ value of 1.5 and a duty cycle value of 0.32 result in operation at a high power-output capability and low variation in the drain waveform. Next, a designer may choose the input DC voltage. The input voltage may be chosen at the point where the output-capacitance of the switching device begins to reach a steady value. The switching device chosen may be, for example, the SiS888 MOSFET (150 V) from Vishay. An input DC voltage of 40V, for example, is suitable.

Next, a circuit designer may use equation (17) to find the value of the loading factor p by substituting the required output current value, the input DC voltage and the maximum load resistance. Using the above values, the value of p is 5:25 and consequently the value of parameter k is 0:656. From equation (18), the value of capacitor $C_1$ is 635 pF. Using the obtained value of k, we find the value of capacitor $C_2$ is 968 pF and consequently the value of inductor $L_2$ is 252:9 nH. The resonant circuit can then be designed accordingly.

From equation (19), a circuit designer using the above values would find the value of the residual reactance X is 203 nH. Subtracting this value from the given coil inductance gives an inductance value of 1:3 μH. Capacitor $C_3$ resonates with this inductance value at the switching frequency, consequently the value of capacitor $C_3$ is 424 pF. The circuit designer now has all the component values, and can implement a load-independent Class EF inverter in accordance with the present disclosure.

Figure 4:
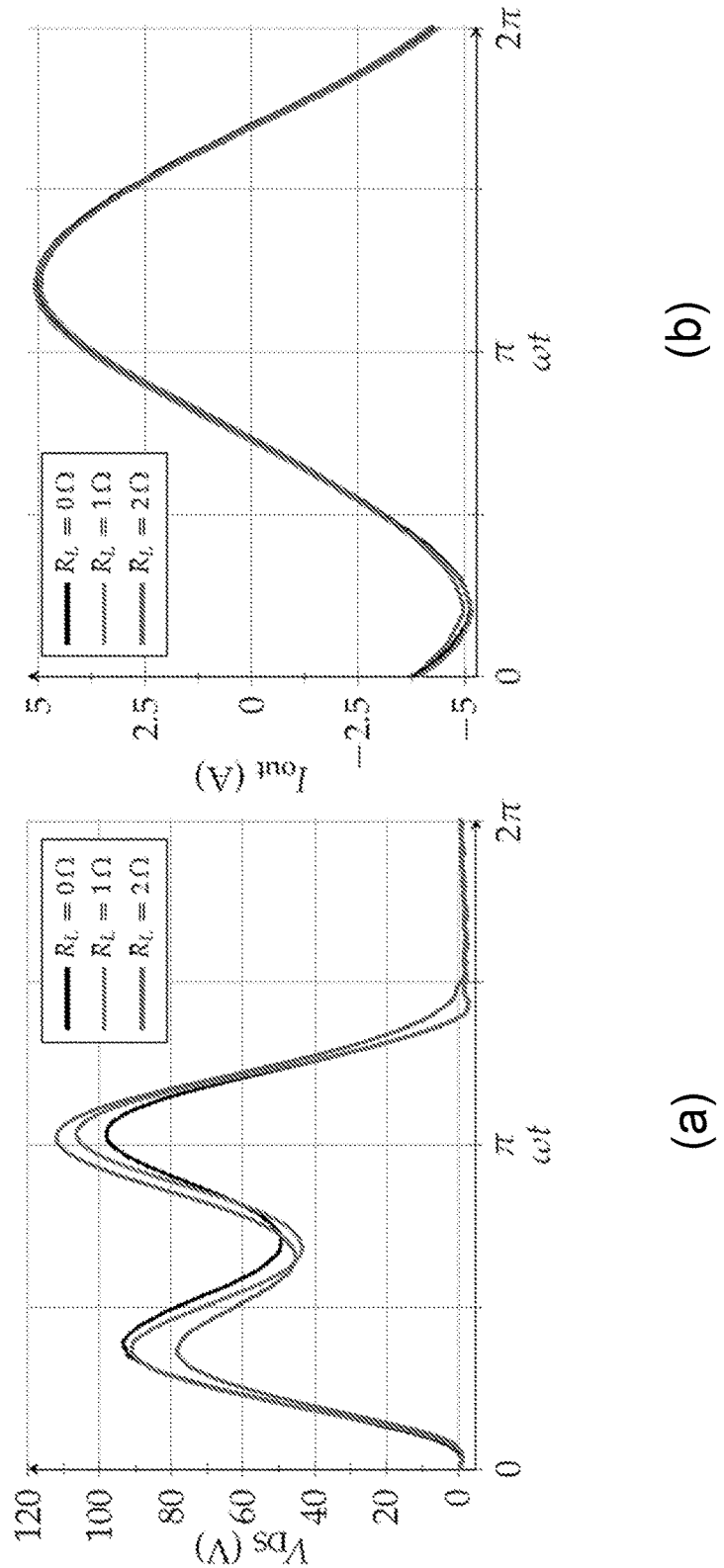
FIG. 4 shows experimentally obtained voltage and current waveforms for an inverter in accordance with an embodiment of the present disclosure.

FIG. 4 shows experimentally obtained voltage and current waveforms for a class EF inverter having the above-described components. It can be seen that near ZVS and constant output current is maintained across the load resistance range.

In the graph of FIG. 4(a), the y axis shows $V_{DS}(V)$. The y axis is measured in increments of 20 from 0 to 120. The x axis shows ωt, measured between 0 and 2π.

In the graph of FIG. 4(b), the y axis shows $X_c$ ($I_o/V_{in}$). The y axis is measured in increments of 0.25 from −5 to. The x axis shows ωt, measured between 0 and 2π.

In each of FIGS. 4 (a) and (b), a black line represents 0Ω, a grey line represents 1Ω, and a blue/teal line shows 2Ω.

It will be appreciated that an inverter according to the present disclosure modifies the existing class EF topology in a way which has never been done before to provide a constant amplitude output ac current along with maintaining zero voltage switching over a load range from zero resistance to an upper limit determined by the designer.

Existing class EF inverters may combine the class E topology with an (or multiple) additional LC network(s), which are always tuned to resonate at some harmonic (usually the second and/or third) of the switching frequency to reduce the harmonic content of the voltage and/or current. This is done to achieve some desired advantage over the pure class E topology such as a lower peak voltage across the switch. This additional LC network acts as a harmonic filter and is based on the traditional approach used in class F RF amplifiers. Current approaches have been based on the understanding that the only solutions to the sets of equations describing simultaneous load-independent output current and load-independent efficiency are impractical.

In inverters according to the present disclosure, in contrast, rather than tuning the resonant circuit/additional LC network to resonate at a harmonic of the switching frequency, the resonant circuit is tuned to have a resonant frequency which is a non-integer multiple of the switching frequency. This enables the inverter to achieve desirable properties such as constant output current over variable load, which had hitherto been considered impossible for the class E based inverters. Tuning the additional LC tank to about 1.5 times the switching frequency and selecting the appropriate capacitance ratio, k=C1/C2, referring to equation (3), both constant current operation and maintenance of zero voltage switching over a wide variation in load can be achieved. k is typically selected to be greater than zero and less than one, and more preferably to be between 0.6 and 0.7.

There are three key application scenarios in wireless power in which an inverter according to the present disclosure may be of benefit. These application scenarios are given below as examples.

1. Long range IPT. This scenario entails a single large transmit coil powering a number of mobile devices such as wireless sensor nodes in a large room at distances of, for example, up to around 10 m. In order to achieve the maximum range it is important for the transmit coil to generate the highest permissible magnetic field within ICNIRP limits. This magnetic field stays constant independent of the number or location of receiver devices and will not be affected by changes in the local environment. For example the power available to one device is not reduced because another device has moved closer to the transmit coil. The present inverter enables this without additional control overhead. Furthermore power throughput control can be achieved simply by receiver load variation without affecting the operation of the transmitter.

2. Mid-range MHz IPT. This scenario entails high Q coils coupled weakly. The transmitted magnetic field can be kept constant as the receive coil moves further from the transmit coil, again enabling the range to be maximised without addition control to prevent exceeding the ICNIRP limits. Power throughput control can again be achieved simply by receiver load variation (at the expense of some link efficiency).

3. Short range IPT. In a closely coupled system the magnetic field strength is strongly determined by both coils and therefore simply controlling the primary coil current is not in general enough to keep the magnetic field strength constant to remain within ICNIRP limits. However such a system can be designed in such a way that changes in receiver load have minimum effect on the receiver coil current (for a small loss in link efficiency). In this scenario, power throughput control could be achieved simply through load variation and the magnetic field would remain almost constant.

It will be understood that the above description of specific embodiments is by way of example only and is not intended to limit the scope of the present disclosure. Many modifications of the described embodiments, some of which are now described, are envisaged and intended to be within the scope of the present disclosure.

In some embodiments, the transistor is not a MOSFET, and may be any other type of transistor or switching device such as a Junction Gate Field-Effect Transistor (JFET) or a Bipolar Junction Transistor (BJT).

It will be appreciated that, instead of a single resonant circuit as shown in FIG. 1, the inverter may comprise a resonant network comprising a plurality of resonant circuits, which have the cumulative effect of providing a resonant network having a resonant frequency which is a non-integer multiple of the switching frequency.

It will be appreciated that the transistor 106 may instead be any suitable switching device.

There is disclosed herein an inverter arranged to drive a load, comprising a transistor having a switching frequency, and having a resonant network having a resonant frequency which is a non-integer multiple of the switching frequency.

It will be appreciated that the above-described concepts can be applied to the receive side rectifier as well as to the transmit side transmitter.

The equations that have been derived for the inverter can also be applied in the case of rectification. The solutions that have been found for inversion, whether for the basic operation or load independent operation, are also applicable in rectification. The solved values of q are the same and solved values of the phase $\varphi_{rec}$ need to be adjusted as follows:

$$\varphi_{rec} = \pi + 2\pi(1-D) - \varphi_o \quad (20)$$

where φo is the solved value for the phase of the output current for the inverter referenced to the positive edge of the switching signal and D is the duty cycle of the switch.

Figure 5:
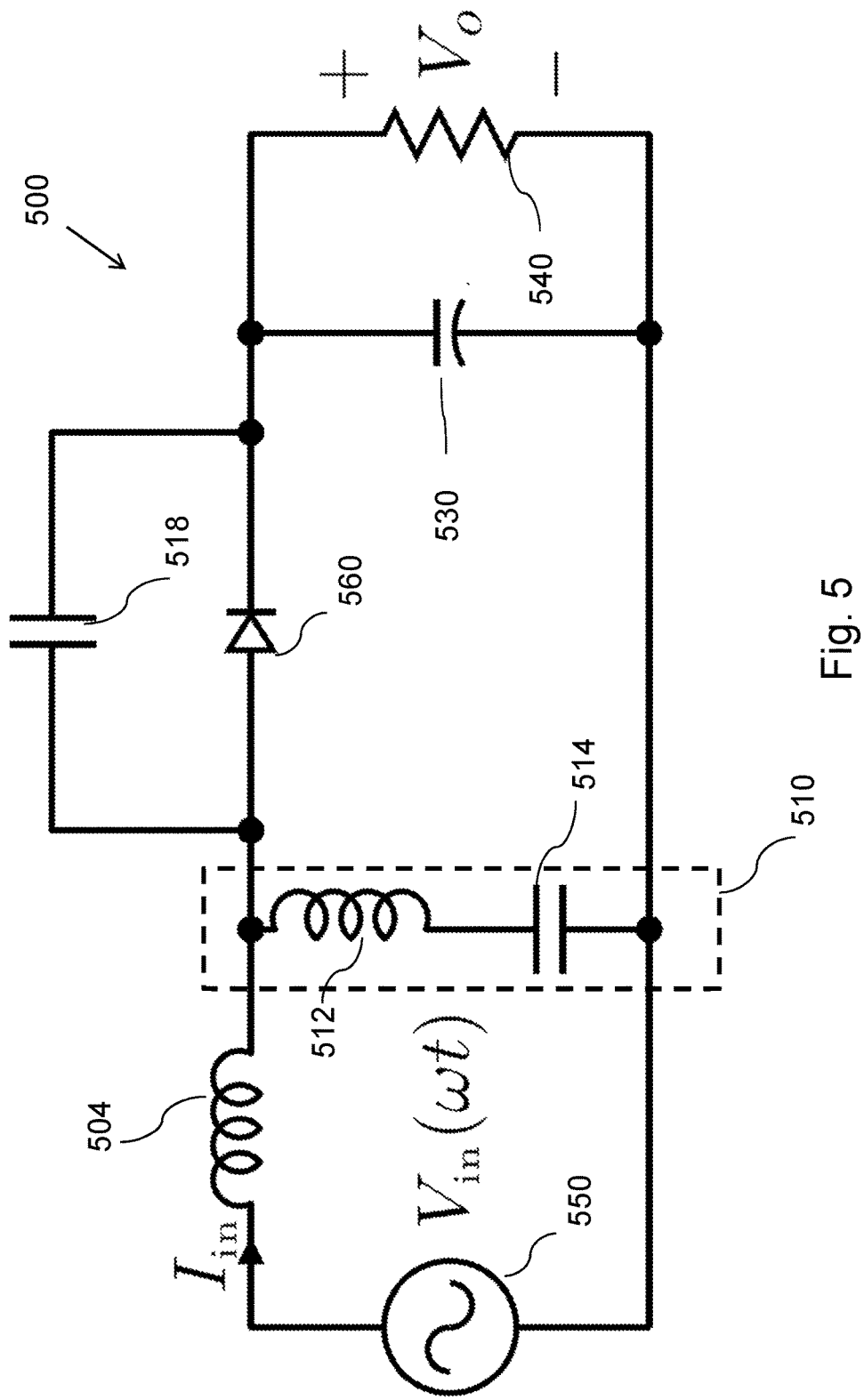
FIG. 5 shows a class EF rectifier in accordance with an embodiment of the present disclosure.

FIG. 5 shows an example of a rectifier 500 in accordance with the present disclosure. The component labels in FIG. 5 correspond with the component labels in FIG. 1. The rectifier 500 is powered by an AC input power supply 550. The power supply 550 supplies an AC power signal to the rectifier 500. In IPT implementations, the input power supply may be a receiver coil, which is arranged to receive a signal from a transmitter coil. In operation as part of an IPT system, a receiver coil receives power from a transmitter coil and thus acts as a source of AC power 550 to the rectifier circuit 500.

The rectifier 500 has a first inductor 504 having a first inductance $L_1$. The power supply 550 is coupled to the first inductor 504. The rectifier 500 is arranged to drive a load resistance 540. The load resistance has a resistance value of $R_L$.

A first capacitor 518 and a first switching device 560 are connected in parallel with each other to the first inductor 504. The switching device 560 is capable of allowing positive and negative current to flow. The switching device is preferably a transistor, preferably a MOSFET, and is preferably the same type of switching device as transistor switching device 106 which can be seen in FIG. 1. The switching device is switched by an appropriate signal from a signal generator.

A resonant circuit 510 is connected in parallel between the first inductor 504 and the power supply 550. The resonant circuit 510 has a second inductor 512 having an inductance $L_2$, and a second capacitor 514 having a second capacitance $C_2$. The resonant circuit 510 has a resonant frequency $F_T$, which is dependent on the values of $C_2$ and $L_2$ as will be appreciated by those skilled in the art.

In embodiments of the present disclosure, the resonant circuit 510 is designed to have a resonant frequency $F_t$ which is a non-integer multiple of the transistor 106 switching frequency $F_{sw}$. Preferably, the non-integer multiple is between 1 and 2, is more preferably between 1.5 and 1.65, and is even more preferably equal to 1.5.

A third capacitor 530 having a third capacitance $C_{DC}$, is connected in parallel between the first capacitance 518 and the input power source 550. The third capacitor 530 is an electrolytic capacitor.

In the circuit of FIG. 5, $I_{in}$ is the steady input current. $I_o$ is the sinusoidal output current that flows in the receiver coil.

The rectifier circuit maintains ZVS at all times with the correct component choices according to the solutions found. The correct component choices include choosing $k=C_1/C_2$, referring to equation (3), to be selected to be typically greater than zero and less than one, and preferably to be between 0.6 and 0.7.

The input current's magnitude and phase remain constant which means that the output voltage or current can be kept constant for any load and the input reactance of the rectifier is always constant for any load. Constant output voltage operation (rectifier only) is realised in a voltage-driven configuration whereas constant output current is realised in the current-driven configuration. It can also be noticed that when the load resistance increases above its optimum value, the current through the rectifying element is negative when it is turned off at 2πD. Therefore a switch capable of allowing positive and negative current to flow should be used.

There is a combined benefit from using both the inverter 100 of FIG. 1 and the rectifier 500 of FIG. 5 in an IPT system, both having resonant circuits having non-integer multiple value of the inverter switching frequency, as this allows the overall system to operate more efficiently over a wide load range. To operate such a system, it is preferable to use a rectifier having a switching device which is switched at a switching frequency which matches the switching frequency of the corresponding switching device in the inverter.

Those skilled in the art will recognize that a wide variety of modifications, alterations, and combinations can be made with respect to the above described examples without departing from the scope of the disclosed concepts, and that such modifications, alterations, and combinations are to be viewed as being within the ambit of the disclosed concepts.

Further aspects of the invention can be understood from the following descriptions:

The following numbered items are herein disclosed:

1. A power inverter for driving a transmitter coil in an inductive power transfer system, wherein the inverter is suitable for class 'E' operation, is arranged to drive a load resistance, and comprises:
  a switching device arranged between a power source and ground and arranged to switch at a switching frequency; and
  a resonant network arranged in parallel with the switching device between the power source and ground, the resonant network having a resonant frequency which is a non-integer multiple of the switching frequency, such that, in operation, a substantially constant current passes through the load resistance.

2. The inverter of item 1, wherein a first node of the switching device is coupled to ground, a second node of the switching device is coupled via a first inductor to a DC supply voltage, and a third node of the switching device is used to switch the switching device on and off.

3. The inverter of item 1 or item 2, wherein a first capacitor is coupled in parallel with the switching device between the power source and ground.

4. The inverter of any preceding item, wherein the resonant network comprises a resonant circuit, the resonant circuit comprising a second inductor and a second capacitor.

5. The inverter of any preceding item, wherein the load comprises the resistance of a transmitter coil.

6. The inverter of any preceding item wherein the load resistance comprises the resistance of at least one receiver coil.

7. The inverter of any preceding item wherein the value of the load resistance can vary.

8. The inverter of any preceding item, wherein the non-integer multiple is preferably between 1 and 2, is more preferably between 1.5 and 1.65, and is even more preferably equal to 1.5.

9. The inverter of any preceding item, wherein a third capacitor and a third inductor are coupled in series with the load resistance.

10. The inverter of any preceding item, wherein the inverter is arranged to maintain zero-voltage-switching operation.

11. A method of fabricating a power inverter for driving a transmitter coil in an inductive power transfer system, wherein the inverter is suitable for class 'E' operation, is arranged to drive a load resistance, and the method comprises:
  arranging a switching device between a power source and ground;
  arranging the switching device to switch at a switching frequency;
  arranging a resonant network in parallel with the switching device between the power source and ground;
  arranging the resonant network to have a resonant frequency which is a non-integer multiple of the switching frequency, such that, in operation, a substantially constant current passes through the load resistance.

12. The method of item 11, wherein the inverter is an inverter according to any of items 1-10.

13. The inductive power transfer system of item 12, wherein the load further comprises a receiver coil spaced from the transmitter coil, the receiver coil being comprised within a receiver circuit arranged to receive power via inductive power transfer from the transmitter circuit.

14. A rectifier for receiving an AC signal from a receiver coil in an inductive power transfer system, wherein the rectifier is suitable for class 'E' operation, is arranged to drive a load resistance, and comprises:
  a switching device arranged between a power source and the load resistance and arranged to switch at a switching frequency; and
  a resonant network having a resonant frequency which is a non-integer multiple of the switching frequency and arranged such that, in operation, a substantially constant current passes through the load resistance.

15. The rectifier of item 14, wherein the non-integer multiple is preferably between 1 and 2, is more preferably between 1.5 and 1.65, and is even more preferably equal to 1.5.

16. The rectifier of item 14 or item 15, wherein the power source comprises a receiver coil.

17. An inductive power transfer system comprising a transmitter circuit and a receiver circuit, the transmitter circuit comprising:
  the inverter of any of items 1 to 10; and
  the rectifier of items 14-16.

18. The inductive power transfer system of item 17, wherein the respective non-integer multiples of the switching frequencies of the inverter and rectifier are equal.

19. The inductive power transfer system of item 17 or item 18, wherein the rectifier resistance load further comprises a receiver coil spaced from the transmitter coil, the receiver coil being comprised within a receiver circuit arranged to receive power via inductive power transfer from the transmitter circuit.

20. A method of fabricating a rectifier for receiving an AC signal from a receiver coil in an inductive power transfer system, wherein the rectifier is suitable for class 'E' operation, is arranged to drive a load resistance, the method comprising:
  arranging a switching device between a power source and the load resistance;
  arranging the switching device to switch at a switching frequency; and
  arranging a resonant network having a resonant frequency which is a non-integer multiple of the switching frequency, such that, in operation, a substantially constant current passes through the load resistance.

21. The method of item 20, wherein the rectifier is the rectifier of any of items 15-17.

22. An inverter, system, transmitter circuit, and/or receiver circuit, substantially as described herein with reference to the drawings.

The invention claimed is:

1. A power inverter for driving a transmitter coil in an inductive power transfer system, wherein the power inverter is suitable for class 'EF' operation, is arranged to drive a load resistance, and comprises:
  a switching device arranged between a power source and ground and arranged to switch at a switching frequency; and
  a resonant network arranged in parallel with the switching device between the power source and ground, the resonant network having a resonant frequency which is a non-integer multiple of the switching frequency, such that, in operation, a substantially constant current passes through the load resistance.

2. The power inverter of claim 1, wherein a first node of the switching device is coupled to ground, a second node of the switching device is coupled via a first inductor to a DC supply voltage, and a third node of the switching device is used to switch the switching device on and off.

3. The power inverter of claim 1, wherein a first capacitor is coupled in parallel with the switching device between the power source and ground.

4. The power inverter of claim 1, wherein the resonant network comprises a resonant circuit, the resonant circuit comprising a second inductor and a second capacitor.

5. The power inverter of claim 1, wherein the load resistance comprises a resistance of the transmitter coil.

6. The power inverter of claim 1 wherein the load resistance comprises a resistance of at least one receiver coil.

7. The power inverter of claim 1 wherein a value of the load resistance can vary.

8. The power inverter of claim 1, wherein the non-integer multiple is between 1 and 2.

9. The power inverter of claim 1, wherein a third capacitor and a third inductor are coupled in series with the load resistance.

10. The power inverter of claim 1, wherein the power inverter is arranged to maintain zero-voltage-switching operation.

11. A method of fabricating a power inverter for driving a transmitter coil in an inductive power transfer system, wherein the power inverter is suitable for class 'EF' operation, is arranged to drive a load resistance, and the method comprises:
   arranging a switching device between a power source and ground;
   arranging the switching device to switch at a switching frequency;
      arranging a resonant network in parallel with the switching device between the power source and ground;
      arranging the resonant network to have a resonant frequency which is a non-integer multiple of the switching frequency, such that, in operation, a substantially constant current passes through the load resistance.

12. The method of claim 11, wherein the inverter is a power inverter comprises:
   a switching device arranged between a power source and ground and arranged to switch at a switching frequency; and
   a resonant network arranged in parallel with the switching device between the power source and ground, the resonant network having a resonant frequency which is a non-integer multiple of the switching frequency, such that, in operation, a substantially constant current passes through the load resistance.

13. A rectifier for receiving an AC signal from a receiver coil in an inductive power transfer system, wherein the rectifier is suitable for class 'EF' operation, is arranged to drive a load resistance, and comprises:
   a switching device arranged between a power source and the load resistance and arranged to switch at a switching frequency; and
   a resonant network having a resonant frequency which is a non-integer multiple of the switching frequency and arranged such that, in operation, a substantially constant current passes through the load resistance.

14. The rectifier of claim 13, wherein the non-integer multiple is between 1.5 and 1.65.

15. The rectifier of claim 13, wherein the power source comprises a receiver coil.

16. An inductive power transfer system comprising a transmitter circuit and a receiver circuit, the transmitter circuit comprising a power inverter and the receiver circuit comprising a rectifier;
   wherein the power inverter is configured for driving a transmitter coil in the inductive power transfer system, wherein the power inverter is suitable for class 'EF' operation, is arranged to drive a load resistance, and comprises:
      a switching device arranged between a power source and ground and arranged to switch at a first switching frequency; and
      a resonant network arranged in parallel with the switching device between the power source and ground, the resonant network having a resonant frequency which is a non-integer multiple of the first switching frequency, such that, in operation, a substantially constant current passes through the load resistance; and
   wherein the rectifier is configured for receiving an AC signal from a receiver coil in the inductive power transfer system, wherein the rectifier is suitable for class 'EF' operation, is arranged to drive a load resistance, and comprises:
      a switching device arranged between a power source and the load resistance and arranged to switch at a second switching frequency; and
      a resonant network having a resonant frequency which is a non-integer multiple of the second switching frequency and arranged such that, in operation, a substantially constant current passes through the load resistance.

17. The inductive power transfer system of claim 16, wherein respective non-integer multiples of the first switching frequency and the second switching frequency are equal.

18. The inductive power transfer system of claim 16, wherein the load resistance of the rectifier further comprises a receiver coil spaced from the transmitter coil, the receiver coil being comprised within a receiver circuit arranged to receive power via inductive power transfer from the transmitter circuit.

19. A method of fabricating a rectifier for receiving an AC signal from a receiver coil in an inductive power transfer system, wherein the rectifier is suitable for class 'EF' operation, is arranged to drive a load resistance, the method comprising:
   arranging a switching device between a power source and the load resistance;
   arranging the switching device to switch at a switching frequency; and
   arranging a resonant network having a resonant frequency which is a non-integer multiple of the switching frequency, such that, in operation, a substantially constant current passes through the load resistance.

20. The method of claim 19, wherein the non-integer multiple is equal to 1.5.

* * * * *